United States Patent
Dahan et al.

(10) Patent No.: US 10,720,991 B2
(45) Date of Patent: *Jul. 21, 2020

(54) OSNR MARGIN MONITORING FOR OPTICAL COHERENT SIGNALS

(71) Applicant: ECI TELECOM LTD., Petach Tikva (IL)

(72) Inventors: David Jimmy Dahan, Ramat Gan (IL); David Jacobian, Ramat Gan (IL)

(73) Assignee: ECI Telecom Ltd., Petach Tikva (IL)

(*) Notice: Subject to any disclaimer, the term of this patent is extended or adjusted under 35 U.S.C. 154(b) by 0 days.

This patent is subject to a terminal disclaimer.

(21) Appl. No.: 16/534,423

(22) Filed: Aug. 7, 2019

(65) Prior Publication Data

US 2020/0127736 A1 Apr. 23, 2020

Related U.S. Application Data

(63) Continuation of application No. 15/822,783, filed on Nov. 27, 2017, now Pat. No. 10,419,110, which is a (Continued)

(51) Int. Cl.
*H04B 10/079* (2013.01)
*H04B 10/61* (2013.01)
(Continued)

(52) U.S. Cl.
CPC ..... *H04B 10/07953* (2013.01); *H04B 10/616* (2013.01); *H04B 10/6161* (2013.01); *H04B 10/6162* (2013.01); *H04L 5/04* (2013.01); *H04B 10/07* (2013.01); *H04B 10/079* (2013.01); *H04B 10/0775* (2013.01); *H04B 10/66* (2013.01); *H04L 27/36* (2013.01)

(58) Field of Classification Search
CPC ............ H04B 10/07953; H04B 10/616; H04B 10/6161; H04B 10/6162; H04B 10/07; H04B 10/0775; H04B 10/079; H04B 10/66; H04L 5/04; H04L 27/36
USPC .......................................................... 398/26
See application file for complete search history.

(56) References Cited

U.S. PATENT DOCUMENTS 6,819,479 B1 * 11/2004 Islam ................. H01S 3/06754
359/337
6,934,479 B2 8/2005 Sakamoto
(Continued)

FOREIGN PATENT DOCUMENTS

CN 1014583 A 3/2008
EP 2475113 7/2012
(Continued)

OTHER PUBLICATIONS

Francesco Vacondio et al., "On nonlinear distortions of highly dispersive optical coherent systems"; Jan. 16, 2012; vol. 20, No. 2 / Optics Express 1032.
(Continued)

*Primary Examiner* — Abbas H Alagheband
(74) *Attorney, Agent, or Firm* — Finnegan, Henderson, Farabow, Garrett & Dunner, LLP

(57) ABSTRACT

A method and a device are provided for monitoring OSNR system margin in optical networks which relies on the relationship that exists between the OSNR value and the ESNR value.

20 Claims, 10 Drawing Sheets

Related U.S. Application Data continuation of application No. 15/122,696, filed as application No. PCT/IL2015/000007 on Feb. 18, 2015, now Pat. No. 9,859,976.

(60) Provisional application No. 61/946,887, filed on Mar. 3, 2014.

(51) Int. Cl.
*H04L 5/04* (2006.01)
*H04L 27/36* (2006.01)
*H04B 10/66* (2013.01)
*H04B 10/07* (2013.01)
*H04B 10/077* (2013.01)

(56) References Cited

U.S. PATENT DOCUMENTS

| | | | | |
|---|---|---|---|---|
| 7,627,248 B2* | 12/2009 | Peisl | ........... | H04J 14/0221 |
| | | | | 398/38 |
| 7,643,752 B2* | 1/2010 | Swenson | ........... | H04B 10/07 |
| | | | | 398/25 |
| 7,664,394 B2* | 2/2010 | Lindsay | ........... | H04B 10/66 |
| | | | | 398/16 |
| 7,986,878 B2* | 7/2011 | Saunders | ........... | H04B 10/5053 |
| | | | | 398/25 |
| 8,743,984 B2 | 6/2014 | Djordjevic | | |
| 8,923,695 B2* | 12/2014 | Lee | ........... | H04J 14/0227 |
| | | | | 398/45 |
| 8,983,290 B2* | 3/2015 | Kim | ........... | H04B 10/0775 |
| | | | | 398/33 |
| 9,225,430 B2* | 12/2015 | Harley | ........... | H04B 10/616 |
| 9,438,370 B2* | 9/2016 | Swinkels | ........... | H04B 10/58 |
| 9,673,899 B2* | 6/2017 | Sunnerud | ........... | H04J 14/06 |
| 2002/0176144 A1* | 11/2002 | Bergano | ........... | H04B 10/671 |
| | | | | 250/338.1 |
| 2003/0007206 A1 | 1/2003 | Sussman | | |
| 2003/0011839 A1 | 1/2003 | Liang | | |
| 2003/0133652 A1* | 7/2003 | Andrekson | ........... | H04B 10/25137 |
| | | | | 385/27 |
| 2004/0161233 A1 | 8/2004 | Zalevsky | | |
| 2006/0291869 A1 | 12/2006 | Lindsay | | |
| 2007/0036084 A1 | 2/2007 | Lindsay | | |
| 2008/0101794 A9 | 5/2008 | Swenson | | |
| 2008/0205886 A1* | 8/2008 | Anderson | ........... | H04B 10/07955 |
| | | | | 398/26 |
| 2009/0080882 A1* | 3/2009 | Cahill | ........... | H04B 10/07953 |
| | | | | 398/26 |
| 2010/0021163 A1 | 1/2010 | Shieh | | |
| 2011/0013914 A1* | 1/2011 | Lowery | ........... | H04B 10/60 |
| | | | | 398/158 |
| 2011/0236025 A1* | 9/2011 | Wagner | ........... | H03L 7/0807 |
| | | | | 398/115 |
| 2014/0341595 A1 | 11/2014 | Harley | | |
| 2015/0110486 A1 | 4/2015 | Sunnerud | | |
| 2015/0333825 A1* | 11/2015 | Kim | ........... | H04B 10/07953 |
| | | | | 398/26 |
| 2015/0333864 A1 | 11/2015 | Swinkels | | |
| 2016/0065304 A1* | 3/2016 | Hauske | ........... | H04B 10/0775 |
| | | | | 398/16 |
| 2016/0127037 A1* | 5/2016 | Cavaliere | ........... | H04L 1/005 |
| | | | | 398/25 |
| 2016/0173198 A1* | 6/2016 | Harley | ........... | H04B 10/616 |
| | | | | 398/26 |
| 2018/0083699 A1 | 3/2018 | Dahan | | |

FOREIGN PATENT DOCUMENTS

| | | |
|---|---|---|
| RU | 2400015 | 9/2010 |
| WO | WO 2004/114567 | 12/2004 |
| WO | WO 2011/022889 | 3/2011 |

OTHER PUBLICATIONS

Edouard Grellier et al., "Quality Parameter for coherent transmissions with Gaussian-distributed nonlinear noise"; Jun. 20, 2011, vol. 19, No. 13 / Optics Express 12787.
David Dahan, "OSNR System Margin Monitoring Technique for Coherent Transparent Optical Networks", Transparent Optical Networks (ICTON), 2014, 16th International Conference, pg. 1-4.
PCT/ISA/21 O—International Search Report, dated Jul. 8, 2015, Israel Patent Office, Jerusalem, Israel.
Office Action and Search Report of Russian Patent Application No. 2016135784, dated Aug. 9, 2018.

* cited by examiner

OSNR MARGIN MONITORING FOR OPTICAL COHERENT SIGNALS

TECHNICAL FIELD

The present invention relates to communication systems using coherent signals and in particularly to monitoring Optical Signal to Noise Ratio (OSNR) margins.

BACKGROUND

Deployment of high speed transparent and reconfigurable optical networks requires effective, flexible and robust Optical Performance Monitoring (OPM) techniques in order to ensure high quality of service as well as high level of resiliency.

The adoption of optical coherent detection, in which the carrier phase and amplitude are recovered at the receiver-side and down-converted to the electrical domain (as opposed to direct detection, in which the phase information is lost), provides an additional degree of freedom to encode and transmit information and therefore a gain in spectral efficiency. Most importantly, this lossless optical-to-electrical signal conversion offers dramatic boost to the applicability of Digital Signal Processing (DSP), following high speed analog to digital conversion.

At the transmitter-side, the DSP may be used mainly as follows:
1. To implement advanced Dual Polarization (DP) modulation formats (for example DP-BPSK, DP-QPSK, DP-8QAM, DP-16QAM) in order to carry more bits per symbol;
2. To enhance spectral efficiency of multi-channel transmission systems by employing techniques such as Nyquist pulse shaping or Orthogonal Frequency Division Multiplexing (OFDM);
3. To implement pre-distortion techniques in order to enhance the resilience of signal propagation to fiber impairments; and
4. To apply software-defined modulation in order to adapt the signal to time/spatial-varying properties of the communication channel and to varying transmission capacity requirements.

At the receiver-side, the DSP may be used mainly to:
1. Ease the requirements of the optical receiver, making coherent reception more cost effective, as complexity may be shifted from the optical domain to the electrical domain (e.g., by applying digital compensation of the frequency carrier offset and the optical phase noise);
2. Compensate distortions caused by signal propagation via the optical network (Chromatic Dispersion ("CD"), Polarization Mode Dispersion ("PMD"), Polarization Dependent Loss ("PDL")), thus enabling to improve the transmission capacity and the reach distance;
3. Provide performance monitoring parameters such as In-Band Optical Signal to Noise Ratio ("OSNR"), Electrical Signal to Noise Ratio ("ESNR"), accumulated CD, PMD and PDL of the detected signal;
4. Adaptively reconfigure signal detection strategies in order to cope with dynamic networks;
5. Enable the use of Soft Decision Forward Error Correction (SD-FEC) techniques to enable increasing impairment resiliency.

With the shift towards advanced coherent modulation formats and the use of DSPs, high spectral efficiency optical networks may be designed with almost no restriction on accumulated CD and PMD. Current technologies enable compensation of up to +/−60 000 ps/nm accumulated CD and 30 ps of PMD. Consequently, the transmission reach is limited mainly by the Amplified Spontaneous Emission ("ASE") noise from the optical amplifiers and the optical nonlinear effects.

Real time monitoring of the OSNR is a requirement set to ensure satisfactory signal quality and to monitor potential failures at the transmission link. Several methods have been proposed in the art to derive the In-Band OSNR level by estimating the in band noise level directly, even in the presence of optical filters along the link. These methods comply with the use of polarization multiplexing and coherent optical modulation formats. Two methods for In-Band OSNR monitoring based on Stimulated Brillouin Scattering ("SBS") effect have been described in the Applicant's patent applications published under US 20120063772 and US 20120219285 and are hereby incorporated by reference.

Other methods which rely upon the use of a DSP in a coherent receiver have also been proposed. For example, Z. Dong, A. P. T Lau and C. Lu, in "OSNR monitoring for QPSK and 16-QAM systems in presence of fiber nonlinearities for digital coherent receivers", Optics Express, vol. 20, no. 17, pp. 19520-19534, 2012, describe a method for fiber-nonlinearity-insensitive OSNR monitoring in digital coherent receivers, which relies on incorporating and calibrating fiber nonlinearity-induced amplitude noise correlations among neighboring symbols into conventional OSNR estimation techniques from received signal distributions.

However, the monitoring of the OSNR level of the signal is still not sufficient in order to monitor the overall OSNR system margin. The overall OSNR system margin is defined as the margin in term of OSNR from the current operating OSNR level of the channel, to the OSNR level that is attained for a given pre FEC Bit Error Rate ("BER") target. Usually, this is the pre FEC BER threshold for which the post FEC BER is $10^{-15}$. Link induced physical degradations, such as received optical power to the receiver, CD, PMD, PDL and more specifically nonlinear effects, can change significantly the OSNR level to be attained for a given BER target and therefore causes difficulties in the estimation of the overall OSNR system margin.

Monitoring the OSNR system margin is required in different phases of the optical network operation, starting from the link commissioning (where one needs to compare actual and expected system margin based on the network design and to proceed therefrom to the necessary adaptations if required), in-traffic operation (in order to monitor potential system degradations and to make the necessary link adaptations and/or signal rerouting if required), and in failure detection (in order to localize the fault location).

OSNR system margin monitoring is particularly beneficial when using software defined optical coherent transceivers, in order to optimize the transceiver adaptive parameters such as the bit rate, symbol rate modulation formats and FEC overhead, as part of the service and network requirements such as reach distance, capacity, service priority and latency.

A conventional prior art method for OSNR system margin monitoring is illustrated in FIG. 1. After being sent along the network link, a portion of the signal to be monitored is tapped off the link and its OSNR level is measured using an Optical Spectral Analyzer ("OSA"), followed by providing the pre FEC BER level by the receiver's FEC decoder module. Typically, in order to reach the pre FEC BER target, the signal OSNR level is deliberately deteriorated prior to reaching the receiver by using two Erbium Doped Fiber Amplifiers (EDFA) set in a cascade configuration with a Variable Optical Attenuator (VOA) that acts as a span loss element located between the two amplifiers. Such approach has the disadvantage of having to use complex and expensive network equipment that prevents its systematic use. Therefore, when required according to this method to measure OSNR margin at a given network node, one might need to physically bring these elements to the geographic location of the node (incurring significant operational expenses) and to find a monitor access point at the link where the signal may be tapped off while avoiding traffic disturbances during the measurement.

U.S. Pat. No. 7,561,797 describes a method and system for controlling OSNR of an optical signal at a receiver end of an optical link. The proposed method is based on degrading the signal at the TX side by implementing one of the following two options:

Option 1: a pre-compensating function is used for a digital filter (e.g. in order to pre-compensate the CD) while leaving a residual impairment at the receiver side (e.g. a residual chromatic dispersion).

Option 2: adding at the transmitter side, a digital electrical noise to the digital electrical signal to be transmitted before the Digital to Analog Converter ("DAC") operates thereon.

However, U.S. Pat. No. 7,561,797 has the disadvantages that it requires to degrade the signal before its transmission via the link, and that information is required to be sent from the receiver, back to the transmitter, via a control channel in order to be able to control the degradation strength. In addition, deriving the in band OSNR only based on the pre FEC BER measurement, is not accurate enough since the pre FEC BER is proportional to the electrical Signal to Noise Ratio (ESNR) and the ESNR and OSNR are linearly proportional only when the OSNR level is low enough and when the only predominant impairment in the link is derived from the ASE noise. In case of a nonlinear impairment and/or CD and PMD impairments, the linear relationship between the ENSR and OSNR is not valid.

Therefore an accurate OSNR system margin monitoring method is required. One that should be robust to link impairments such as fiber nonlinearities, CD, PMD and PDL. Such a method should not affect the signal service quality and should enable remote monitoring operation in order for it to be cost effective.

SUMMARY OF THE DISCLOSURE

It is an object of the present disclosure to provide a novel, relatively inexpensive method, insensitive to physical link impairments for OSNR system margin monitoring in optical networks.

It is another object of the present disclosure to provide a method which complies with coherent modulation formats that can be carried out transparently, without affecting the signal quality and without requiring installation of complex equipment at the network nodes.

Other objects of the invention will become apparent as the description of the invention proceeds.

The relationship between the OSNR and ESNR for coherent optical signals is described according to the publication "On the nonlinear distortions of highly dispersive optical coherent systems" by F. Vacondio et al. (Optics Express, vol. 20, no. 2, pp 0.1022-1032, 2012) as follows:

$$ESNR = \frac{A \times OSNR}{1 + K \times OSNR}$$

wherein the parameter "A" is associated with the transmission characteristics (e.g. symbol rate, modulation format, bandwidth of the receiver's electrical filter, and optical bandwidth of the optical filter prior to detecting the signal), whereas the parameter "K" (being the overall physical impairment strength parameter) refers to the saturation effect that exists between the OSNR and the ESNR (for OSNR>>1/K, the ESNR approaches the value of A/K) and is associated with the physical impairments of the link along which the coherent optical signals have been conveyed, such as optical received power, CD, PMD, PDL and nonlinear fiber effects.

According to a first aspect of the disclosure, there is provided a method for monitoring OSNR system margin in optical networks, which comprises the steps of:

(i) receiving a coherent optical signal in a digitalized form;

(ii) obtaining a value of a current OSNR, ($OSNR_{dB}$), associated with the received coherent optical signal;

(iii) obtaining a value for a current ESNR, ($ESNR_{1,dB}$), associated with the received coherent optical dB) signal;

(iv) determining a value for a reference ESNR, ($ESNR_{2,dB}$);

(v) retrieving a value for a parameter A that is associated with transmission characteristics that relate to the received coherent optical signals;

(vi) calculating a value for a parameter K that is associated with physical impairments of a channel along which the coherent optical signal was conveyed prior to its reception; and (vii) determining a value of the OSNR system margin, ($\Delta OSNR_{dB}$), based on current values of $ESNR_{1,dB}$, $ESNR_{2,dB}$, parameter A and parameter K and deriving therefrom changes that occur in the OSNR system margin being monitored.

According to another embodiment, step (vii) further comprises calculating ESNR margin, $\Delta ESNR_{dB}$, by:

$$\Delta ESNR_{dB} = ESNR_{1,dB} - ESNR_{2,dB}$$

In accordance with another embodiment, a value of the OSNR system margin, ($\Delta OSNR_{dB}$), is determined by applying the following equation:

$$\Delta OSNR_{dB} = \Delta ESNR_{dB} - 10\log_{10}\left(A - K \times 10^{\frac{ESNR_{1,dB}}{10}}\right) + 10\log_{10}\left(A - K \times 10^{\frac{ESNR_{2,dB}}{10}}\right)$$

By yet another embodiment, the value of the reference ESNR, ($ESNR_{2,dB}$), is determined in step (iv) by adding digital noise to the coherent optical signal being in a digitalized form, until the value for $ESNR_{2,dB}$ is such that the value of the pre-defined BER target is reached.

According to still another embodiment, the value of the reference ESNR, ($ESNR_{2,dB}$), is retrieved from a database (e.g. a look up table).

In accordance with another embodiment, step (vi) is carried out by calculating the value of parameter K of the channel along which the coherent optical signal was received by:

$$K = \frac{A}{10^{\frac{ESNR_{1,dB}}{10}}} - \frac{1}{10^{\frac{OSNR_{dB}}{10}}}$$

By yet another embodiment, the method provided further comprises a step that when the value of the OSNR system margin, ($\Delta OSNR_{dB}$), of an optical channel being monitored is below a pre-defined value, a switch over is initiated, whereby traffic would be diverted from that optical channel to another optical channel.

According to another aspect of the disclosure, there is provided a coherent receiver apparatus configured to be used in an optical communication network, and comprising:

a receiver configured to receive a coherent optical signal in a digitalized form;

an OSNR monitor configured to measure a value of current OSNR, ($OSNR_{dB}$) associated with the received coherent optical signal;

an analyzer (e.g. a spectrum analyzer or a suitable signal analyzer) configured to measure a value of current ESNR, ($ESNR_{1,dB}$), associated with the received coherent optical signal;

at least one processor (e.g. a Digital Signal Processing (DSP) device) configured to:
determine a value for a reference ESNR, ($ESNR_{2,dB}$);
retrieve a value for a parameter "A" that is associated with transmission characteristics that relate to the received coherent optical signals;
calculate a value for a parameter "K" that is associated with physical impairments of a channel along which the coherent optical signal was received; and
determine a value of the OSNR system margin, ($\Delta OSNR_{dB}$), based on current values of $ESNR_{1,dB}$, $ESNR_{2,dB}$, parameter A and parameter K and deriving therefrom changes that occur in the OSNR system margin being monitored.

The term "an OSNR monitor" or "an OSNR monitor device" as used herein throughout the specification and claims, is typically a device which has the functionality of one or more of the following: an optical spectral analyzer, an RF spectrum analyzer, a delay tap asynchronous sampler or a nonlinear optical device such as an optical parametric amplifier or a stimulated Brillouin ring laser.

According to an embodiment of this aspect of the disclosure, the at least one processor is further configured to calculate an ESNR margin, $\Delta ESNR_{dB}$, by:

$$\Delta ESNR_{dB} = ESNR_{1,dB} - ESNR_{2,dB}$$

By yet another embodiment one or more of the at least one processor is further configured to determine a value of the OSNR system margin, ($\Delta OSNR_{dB}$), by applying the following relationship:

$$\Delta OSNR_{dB} = \Delta ESNR_{dB} - 10\log_{10}\left(A - K \times 10^{\frac{ESNR_{1,dB}}{10}}\right) + 10\log_{10}\left(A - K \times 10^{\frac{ESNR_{2,dB}}{10}}\right)$$

According to still another embodiment, the coherent receiver apparatus further comprising a digital noise generator configured to generate a digital noise (e.g. a digital noise having a normal distribution) and wherein one or more of the at least one processor is further configured to determine the value of the reference ESNR, ($ESNR_{2,dB}$), by adding and combining, in a controlled way, the generated digital noise with the coherent optical signal being in a digitalized form, until the value for $ESNR_{2,dB}$ is such that a value of a pre-defined BER target is reached.

In accordance with another embodiment, one or more of the at least one processor is further configured to calculate the value of parameter K of the channel along which the coherent optical signal was received, by applying the following relationship:

$$K = \frac{A}{10^{\frac{ESNR_{1,dB}}{10}}} - \frac{1}{10^{\frac{OSNR_{dB}}{10}}}$$

According to another embodiment, one or more of the at least one processor is further configured to retrieve the value of the reference ESNR, ($ESNR_{2,dB}$), from a database. Preferably, the database comprises entries of reference ESNR, ($ESNR_{2,dB}$), that depend upon at least one member of a group that consists of modulation format of the coherent optical signal received, symbol rate of the coherent optical signal received, and optical filtering mode (e.g. colored (optical filter bandwidth) optical filtering mode or colorless optical filtering mode).

By yet another embodiment, the source for the noise may be an analog electrical source that may be added to the coherent optical received signal, prior to its digitalization (e.g. by using an Analog to Digital Convertor ("ADC")).

The method described herein enables monitoring of the OSNR system margin of optical coherent signals as well as the overall physical impairment strength parameter in real modern optical networks without requiring an external ASE optical source. Furthermore, this approach does not require on-site human involvement since it can be carried out remotely. It is robust to physical impairments (especially to nonlinear fiber effects) and provides excellent accuracy.

It should be understood that the method provided herein is applicable to various coherent modulation formats, for example, BPSK (Binary Phase shift Keying), M-ary PAM (Pulse Amplitude Modulation), QPSK (Quaternary Phase Shift Keying), M-ary QAM (Quadrature Amplitude Modulation), and the like. In addition, the method is also applicable for cases of dual polarization versions of the above modulation formats, with both single carrier (Orthogonal Frequency Division multiplexing) OFDM approaches.

Nonlinear impairments (also referred to as "nonlinear interference noise") that are present along the link, may lead to addition of a circularly Gaussian distributed noise at the recovered signal constellation after its processing (e.g. by the DSP). This is the case for non dispersion managed optical links. In such a case, the ESNR reference for the target pre-FEC BER is independent of the physical link impairments (in contrast to the OSNR reference for the target pre-FEC BER). Therefore, the use of a lookup table for the reference ESNR may be preferred.

However, in case the coherent optical signal is conveyed along a dispersion managed link, the nonlinear interference noise distribution deviates from a circular normality. Thus, using a lookup table approach for retrieving the reference ESNR therefrom, might lead to some inaccuracies, especially for low target pre-FEC BER levels ($<4\times10^{-3}$). In such cases, it would be preferred to implement the embodiments described hereinbefore, by which digital noise is generated and added in a controlled way to the signal, until a reference ESNR is found that satisfies a pre-defined value of the target pre-FEC BER.

Due to the nature of coherent detection, the operation may also be carried out by using a colorless approach (i.e. without installing any optical filter that precedes the receiver). In such a case, a single monitor may be used for scanning the OSNR system margin of the optical coherent channels that are present in the optical spectrum, only by tuning the local oscillator optical frequency to the respective optical frequencies of the optical coherent channels.

BRIEF DESCRIPTION OF THE DRAWINGS

For a more complete understanding of the present invention, reference is now made to the following detailed description taken in conjunction with the accompanying drawings wherein:

FIG. 5A presents experimental results of the dependency of ESNR on the OSNR for different launched optical power levels, for 120.6 Gb/s DP-QPSK channel with a received optical power of −10 dBm;

FIG. 5B presents experimental results for the dependency of ESNR and OSNR thresholds for BER targets of $1.5 \times 10^{-2}$ and $2 \times 10^{-3}$ respectively, on the launched optical power levels for 120.6 Gb/s DP-QPSK channel with received optical power of −10 dBm;

FIG. 5C presents exemplary experimental results of a comparison held between prior art and the method provided by the present disclosure of OSNR system margin monitoring as a function of the launched power for 120.6 Gb/s DP-QPSK channel;

FIG. 6A presents experimental results of the dependency of ESNR on the OSNR for different launched optical power levels for 120.6 Gb/s DP-QPSK channel with a received optical power of −10 dBm;

FIG. 6B presents experimental results of the dependency of ESNR and OSNR thresholds for BER targets of $1.5 \times 10^{-2}$ and $2 \times 10^{-3}$ on the launched optical power levels for 120.6 Gb/s DP-QPSK channel with a received optical power of −10 dBm;

FIG. 6C presents exemplary experimental result of a comparison held between prior art and the method provided by the present disclosure of OSNR system margin monitoring as function of the launched power for 120.6 Gb/s DP-QPSK channel;

DETAILED DESCRIPTION

In the disclosure, the term "comprising" is intended to have an open-ended meaning so that when a first element is stated as comprising a second element, the first element may also include one or more other elements that are not necessarily identified or described herein, or recited in the claims. For the purposes of explanation, numerous specific details are set forth in order to provide a thorough understanding of the present invention. It should be apparent, however, that the present invention may be practiced without these specific details.

Figure 1:
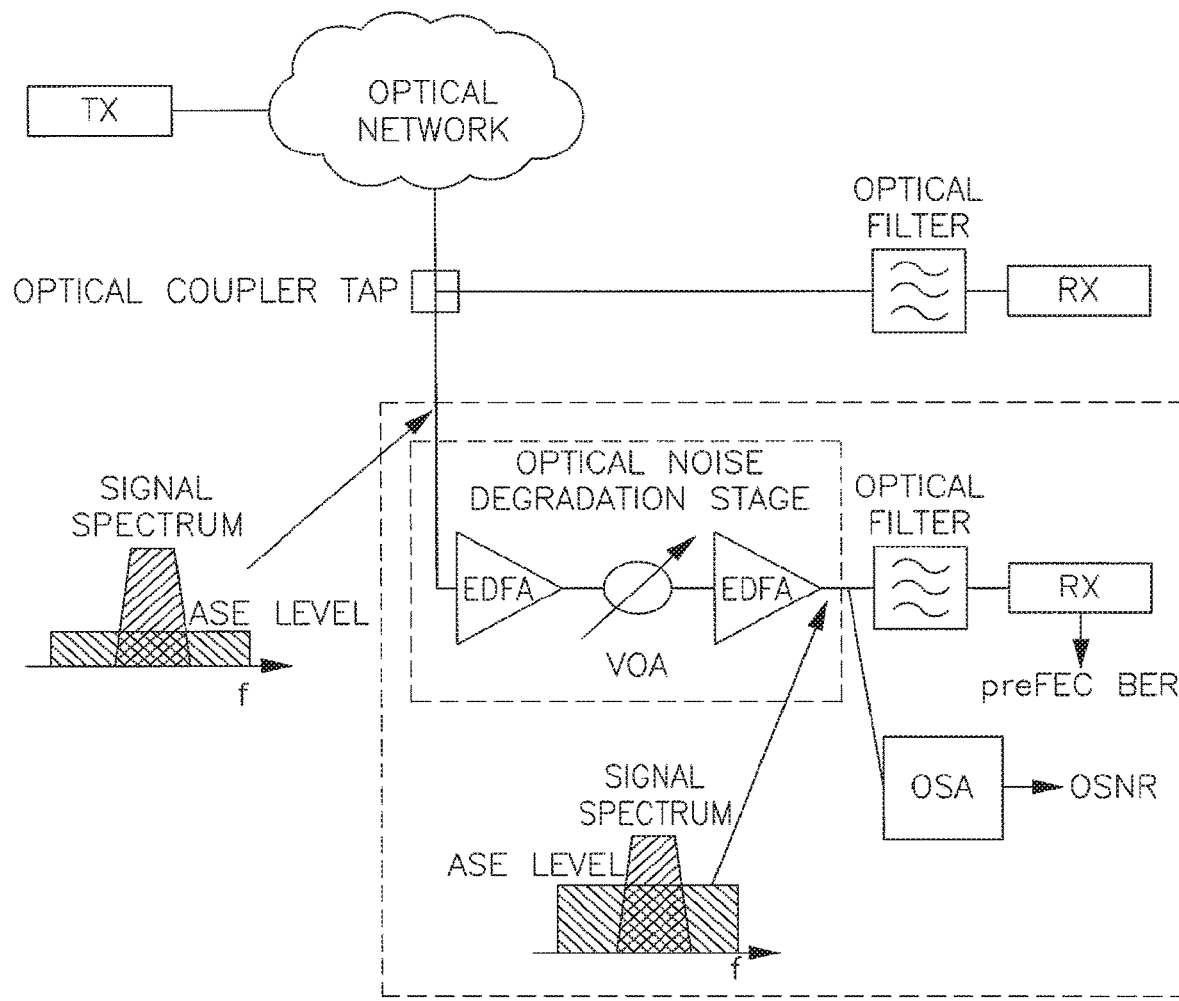
FIG. 1 illustrates a prior art system implementing OSNR system margin measurement based on the use of a broadband ASE noise source and an OSA.

FIG. 1 illustrates a prior art set-up for OSNR system margin measurement that relies on the use of a broadband ASE noise source and OSA. After conveying the signal through the network's link, a portion of the signal to be monitored is tapped off the link. The signal OSNR level is measured by using an Optical Spectral Analyzer (OSA), and the FEC decoder module of the receiver provides the pre FEC BER level. In order to reach the pre FEC BER target, the signal OSNR level is deteriorated before the receiver by using two Erbium Doped Fiber Amplifiers (EDFAs) in a cascade configuration with a Variable Optical Attenuator (VOA) that acts as a span loss compensating element located between the two amplifiers. Such an approach has the disadvantage of requiring the use of complex and expensive network equipment that inhibit operator from its use in their systems. Therefore, according to the prior art solution, when one is required to carry out OSNR margin measurements at a given network node, one may need to physically bring these pieces of equipment to the geographic location of the node (resulting in significant operational expenses) and to find a monitor access point at the link where the signal may be tapped off without introducing traffic interference while taking these measurements.

Figure 2:
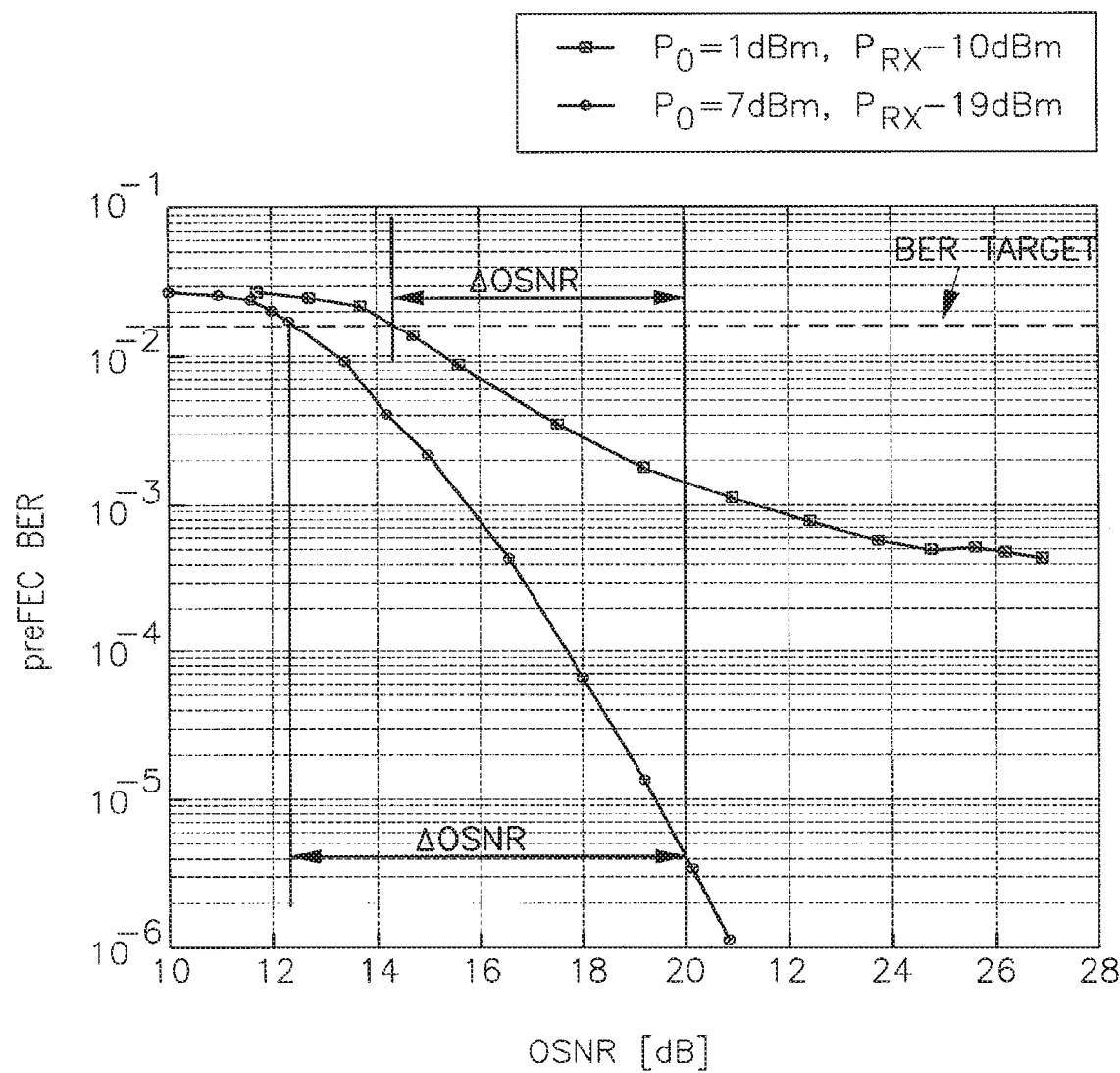
FIG. 2 illustrates an example demonstrating how physical link impairments affect the OSNR system margin.

FIG. 2 presents two scenarios of the dependency of the pre FEC BER target of $1.5 \times 10^{-2}$ on the OSNR in an example where traffic of a single channel of 120.6 Gb/s DP-QPSK is transmitted over five spans, each one of these spans comprises 100 km of standard single mode fiber (which is in compliance with ITU-T Recommendation G.652):

Scenario 1: launched power per span is 1 dBm and the received optical power is −10 dBm (linear transmission case); and Scenario 2: launched power per span is 7 dBm and the received optical power is −19 dBm (nonlinear transmission case).

The pre FEC BER target is reached at OSNR=12.6 dB for scenario 1, and OSNR=14.5 dB for scenario 2. Assuming that the OSNR at the link end is 20 dB, the OSNR system margin is 7.4 dB and 5.5 dB for scenarios 1 and 2, respectively. Such an example demonstrates the importance of having an accurate estimation of the OSNR system margin, as it is very sensitive to the working conditions of the system.

Figure 3:
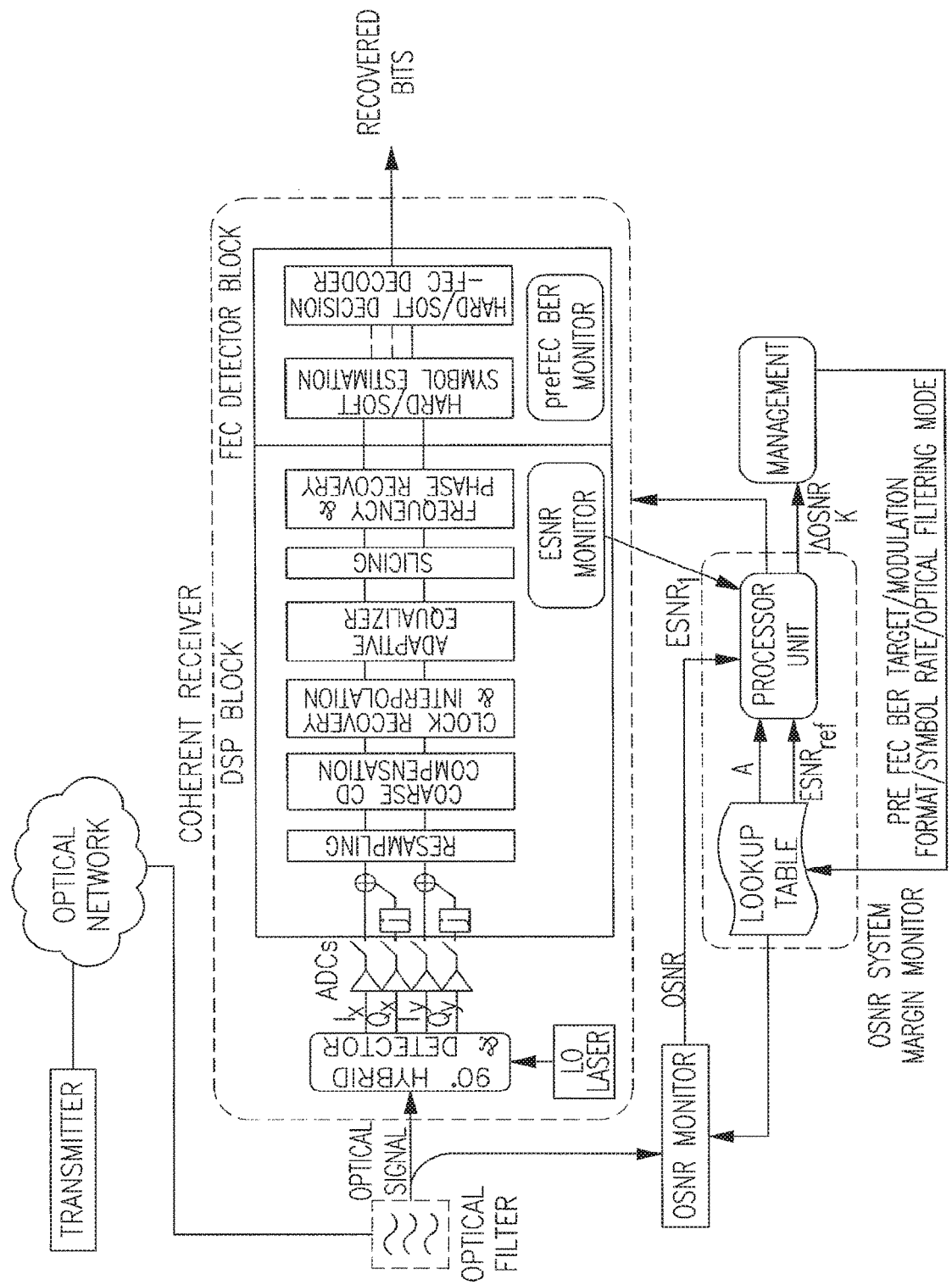
FIG. 3 illustrates a schematic implementation of an embodiment of the present disclosure by which OSNR system margin monitoring is based upon monitoring the ESNR and OSNR and the use of a lookup table to extract values for the parameter A and the reference ESNR.

FIG. 3 illustrates a schematic view of an embodiment of the present disclosure of an OSNR system margin monitoring based on ESNR and OSNR monitoring and the use of a database to extract the required values associated with parameter A and the reference ESNR. After being conveyed along the network link, the optical signal arrives at its termination point and is forwarded to the coherent receiver. Before the coherent detection, the optical signal may optionally be filtered by using an optical filter (colored detection) or it may be detected without passing through an optical filter (colorless detection). In the latter case, all the optical signals conveyed via the channels present in the fiber, would be forwarded to the optical receiver. Colorless detection is not harmful since the correct selection is made while knowing the local oscillator frequency, which in turn determines which channel is coherently detected. After converting the optical signal to the electrical domain, it is digitalized using four high speed ADCs, and sent to a DSP block in order to compensate for fiber impairments such as accumulated CD, polarization crosstalks, PMD and PDL. Digital compensation of the frequency carrier offset and optical phase noise may also be performed. After applying these impairment compensation algorithms, the noisy symbols are recovered and are estimated using hard or soft detection techniques. The ESNR is estimated based on the hard or soft symbol decision and the FEC decoder block has the ability to provide the pre FEC BER.

The OSNR system margin monitor acquires from the management unit, necessary information that relates to the signal to be monitored, such as the pre FEC BER target, modulation format, symbol rate and optical filtering mode: i.e. colored or colorless (meaning, subjecting or not the arriving signal to an optical filtering prior to its arrival at the receiver). In the colored mode case, the information of the optical filter bandwidth would also be provided. With this information, the OSNR system margin monitor extracts from a lookup table the value of the A parameter and the ESNR at the target pre FEC BER, referred to throughout the specification and claims as $ESNR_{2dB}$ or $ESNR_{ref,dB}$. In addition, the OSNR system margin monitor sends a request to an external inband OSNR monitor module, in order to obtain the OSNR level of the channel to be monitored. It also sends a request to the coherent receiver in order to get the ESNR level of the detected channel, denoted as $ESNR_{1dB}$.

Using the following equation, $$\Delta ESNR_{dB} = ESNR_{1,dB} - ESNR_{ref,dB}$$

the OSNR margin monitor may evaluate the ENSR margin of the channel. The overall physical impairment strength parameter (denoted as K parameter) is evaluated using the following equation:

$$K = \frac{A}{10^{\frac{ESNR_{1,dB}}{10}}} - \frac{1}{10^{\frac{OSNR_{dB}}{10}}}$$

This parameter takes into account the combination of different physical impairments associated with the link, such as the optical detected power, the residual CD, residual PMD, residual PDL, that are not compensated by the DSP of the coherent receiver, as well as the nonlinear impairment (or residual nonlinear impairment if a nonlinear compensation equalizer is used). Finally, using $ESNR_{1,dB}$, $ESNR_{ref,dB}$, A and K parameters, the OSNR margin, the value of the $\Delta OSNR_{dB}$ may be derived by using the following relationship:

$$\Delta OSNR_{dB} = \Delta ESNR_{dB} - 10\log_{10}\left(A - K \times 10^{\frac{ESNR_{1,dB}}{10}}\right) + 10\log_{10}\left(A - K \times 10^{\frac{ESNR_{ref,dB}}{10}}\right)$$

The values of the $\Delta OSNR_{dB}$ and/or of the parameter K (associated with the overall physical impairment strength parameter) may be returned to the management unit for use in its supervision, or for taking a further action if needed. The OSNR system margin monitor may be part of the embedded software of a transceiver/combiner card that contains the coherent transmitter/receiver line module or it may be integrated within a DSP unit comprised in the coherent receiver.

Due to the nature of the coherent detection, the monitoring of the OSNR margin may also be carried out by applying a colorless approach (i.e. without using any optical filter before the signal arrives at the receiver). In such a case, a single proposed monitor may be used for scanning the OSNR system margin of the optical coherent channels present in the optical spectrum, simply by tuning the local oscillator optical frequency to the corresponding optical frequencies of the channels.

Figure 4:
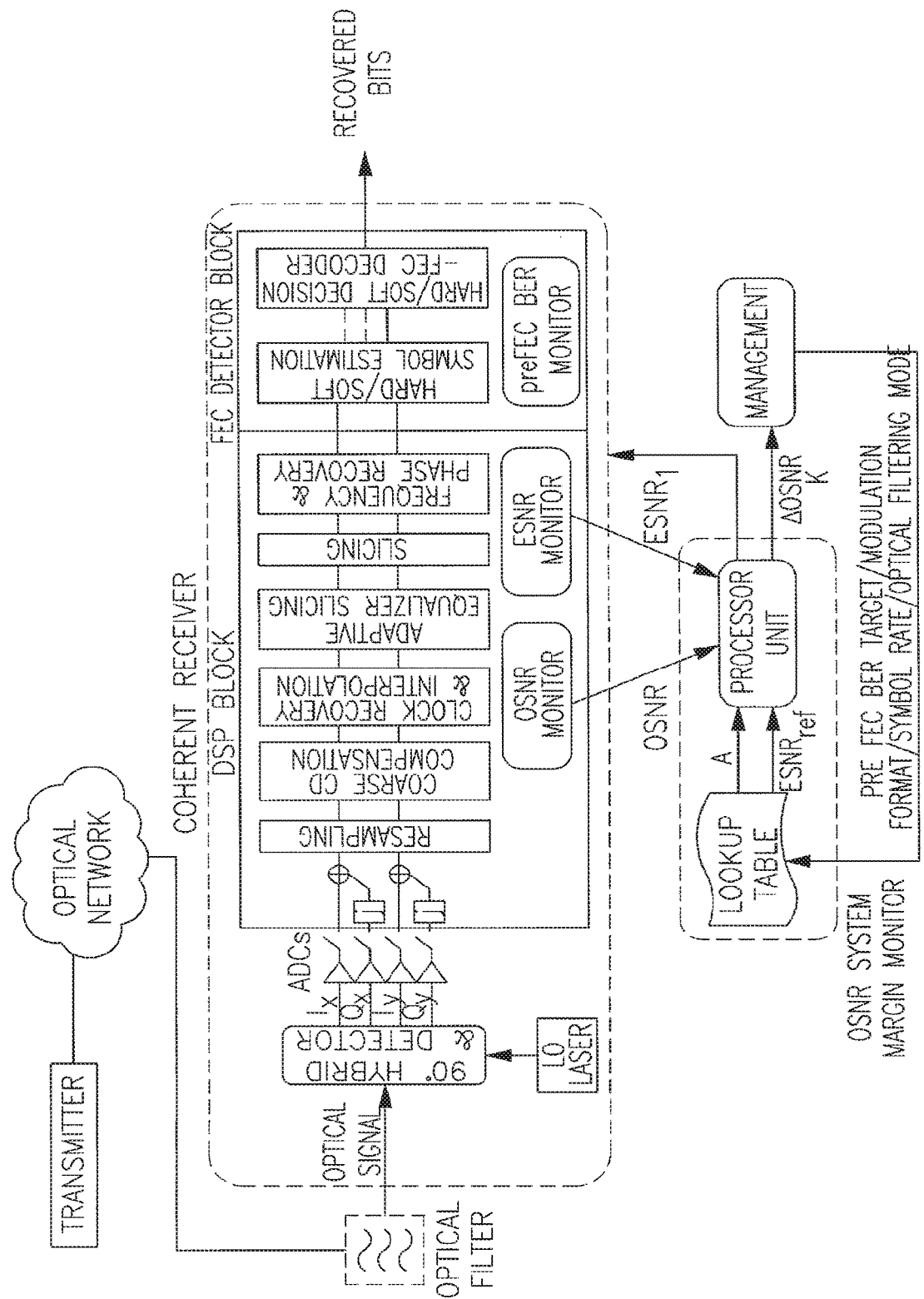
FIG. 4 illustrates a schematic implementation of another embodiment of the present disclosure by which OSNR system margin monitoring is based upon monitoring the ESNR and OSNR and the use of a lookup table to extract the values for the parameter A and the reference ESNR.

FIG. 4 is a schematic illustration of another embodiment of the present disclosure of the OSNR system margin monitor based on ESNR and OSNR monitoring and the use of a lookup table to extract the A and the $ESNR_{ref}$ parameters. According to the present embodiment, the OSNR monitoring is performed within a DSP block of the coherent receiver.

Figure 5A:
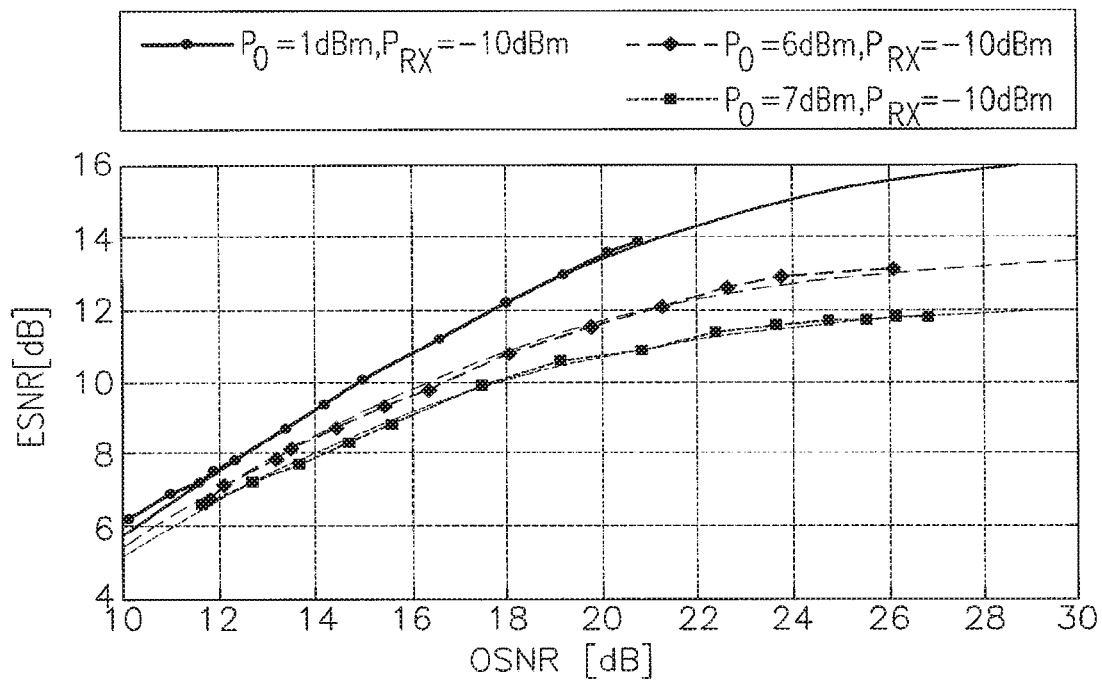
FIGS. 5A-5C demonstrate exemplary experimental results obtained while transmitting in 2×120.6 Gb/s DP-QPSK channels together with 2×45.8 Gb/s DP-QPSK channels over a non dispersion managed 5×100 km link.
Figure 5B:
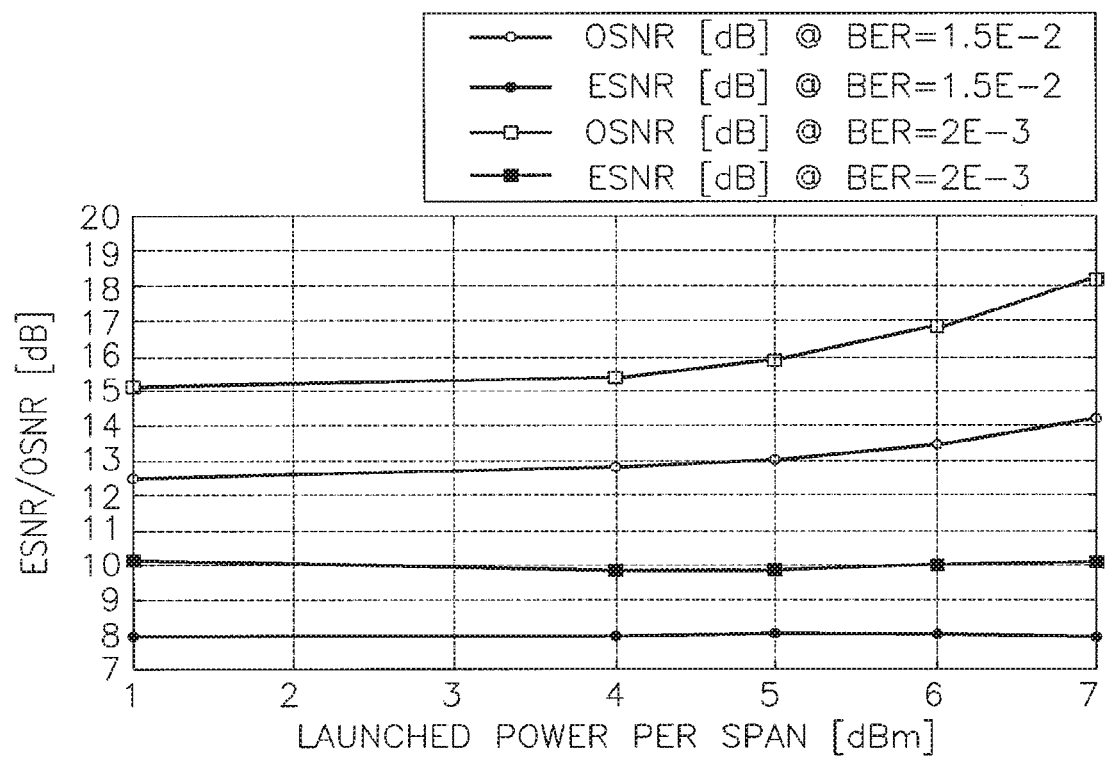
Figure 5C:
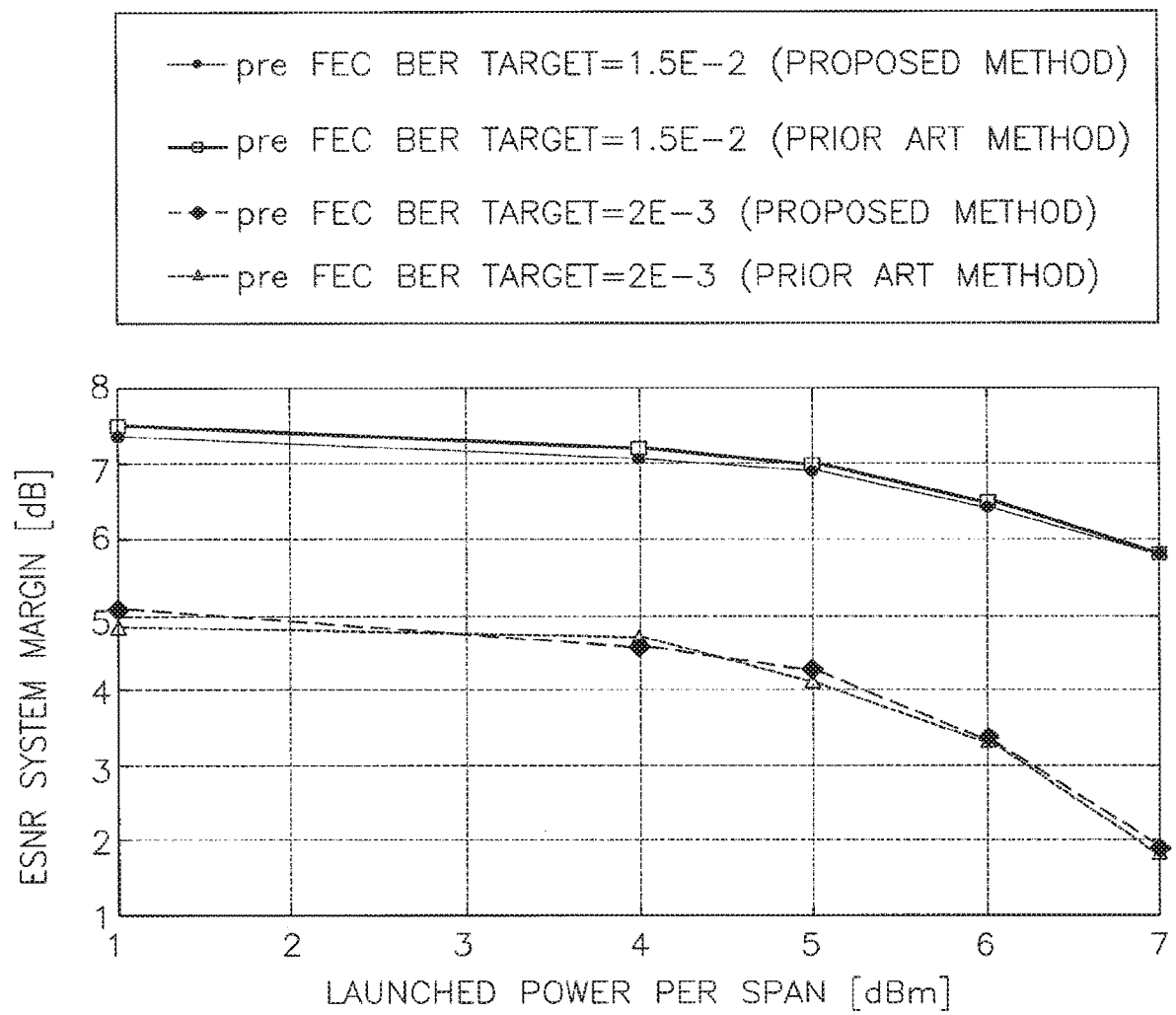

FIGS. 5A-5C exemplify experimental results of 2×120.6 Gb/s DP-QPSK channels being co-transmitted with 2×45.8 Gb/s DP-QPSK channels over a non dispersion managed link consisting of 5×100 km of fiber that complies with ITU-T Recommendation G.652. The channels are 50 GHz spaced from each other and the OSNR margin is measured using the method described in FIG. 3 for one of the two 120.6 Gb/s channels.

FIG. 5A presents experimental results demonstrating the dependency of the ESNR on the OSNR for different launched optical power levels for 120.6 Gb/s DP-QPSK channel with a received optical power of −10 dBm. It may be seen that the ESNR dependency on the OSNR matches the following relationship:

$$ESNR = \frac{A \times OSNR}{1 + K \times OSNR}$$

As the launched power per span increases, the channel undergoes higher nonlinear impairment, which is translated into nonlinear interference noise in the coherent detection. The dashed curves illustrate an excellent fitting with the measurement and the following A, and K parameters were obtained as functions of the launched power:

| Launched power per span | P = 1 dBm | P = 6 dBM | P = 7 dBM |
|---|---|---|---|
| A | 0.41 | 0.41 | 0.41 |
| K | 0009 | 0.018 | 0.025 |

It may be seen that in non dispersion managed links, only the K parameter is affected by the nonlinear impairments, while the A parameter remains constant. Parameter A depends only on the link characteristics such as the symbol rate, modulation format, filtering mode, and therefore the A parameter values may be stored at a lookup table having the following entries: the symbol rate, modulation format and filtering mode.

FIG. 5B illustrates experimental results of the dependency between the required ESNR and OSNR thresholds for BER targets of $1.5 \times 10^{-2}$ and $2 \times 10^{-3}$, on the launched optical power levels per span for a 120.6 Gb/s DP-QPSK channel having a received optical power of −10 dBm. It may be seen that for both pre FEC BER targets, the required ESNR is independent of the launched power per span, whereas the OSNR that is required in order to allow reaching the pre FEC BER target, increases along with the launched power per span as a result of the nonlinear impairments. When the optical launched power is increased from 1 dB to 7 dB, the required OSNR level for $1.5 \times 10^{-2}$ pre FEC BER target increases by 1.3 dB, while the required OSNR level for $2 \times 10^{-3}$ pre FEC BER target increases by 3.05 dB. The ESNR required for reaching the respective pre FEC BER target is independent of the launched optical power per span since in non-dispersion managed link, the nonlinear interference noise is typically circularly symmetric complex Gaussian distributed as the ASE noise and therefore cannot be distinguished from the ASE noise. Therefore, the required ESNR values may be acquired in a back to back set up in a colored or colorless filtering mode configuration (i.e. without a fiber but with an ASE noise source, in order to tune the OSNR as well as the ESNR levels), and be stored at a lookup table having entries that are: function of the pre FEC BER target, symbol rate, modulation format and filtering mode.

FIG. 5C exemplifies an experimental comparison between the results obtaining by following the prior art method illustrated in FIG. 1, with the results obtained by implementing the proposed method of OSNR system margin monitoring, as a function of the launched power for a 120.6 Gb/s DP-QPSK channel, for pre FEC BER targets of $1.5 \times 10^{-2}$ and $2 \times 10^{-3}$, respectively. It is assumed that the channel OSNR at the receiver is fixed at 20 dBm, the ESNR reference values are set to 8.15 dB and 10.1 dB for the pre FEC BER levels of $1.5 \times 10^{-2}$ and $2 \times 10^{-3}$ respectively, and the optical received power is −10 dBm. The figure demonstrates a good match of the results obtained by the two methods, with an error under 0.2 dB for both pre FEC BER targets.

Figure 6A:
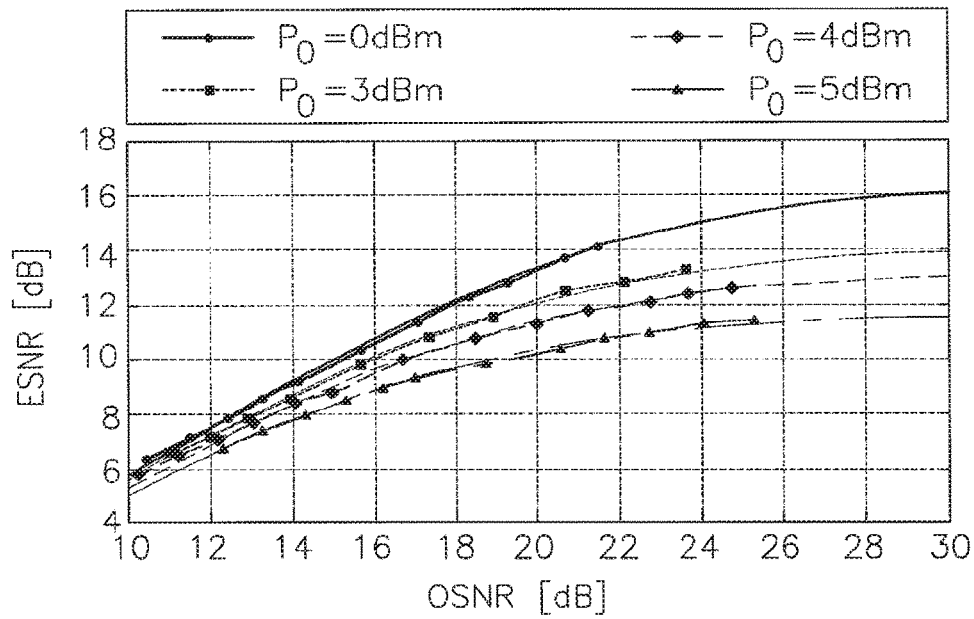
FIGS. 6A-6C illustrate exemplary experimental results obtained while transmitting in 1×120.6 Gb/s DP-QPSK channels together with 2×45.8 Gb/s DP-QPSK channels and 4×10.7 OOK channels over a dispersion managed 5×100 km of G.652 link.
Figure 6B:
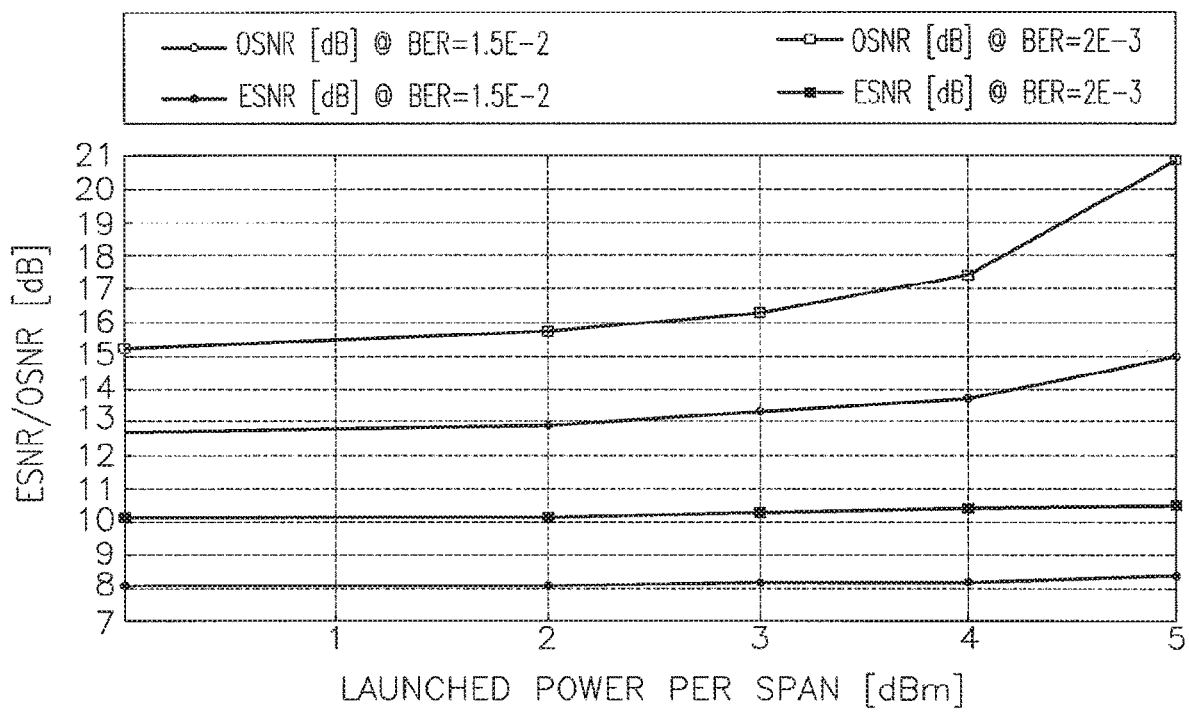
Figure 6C:
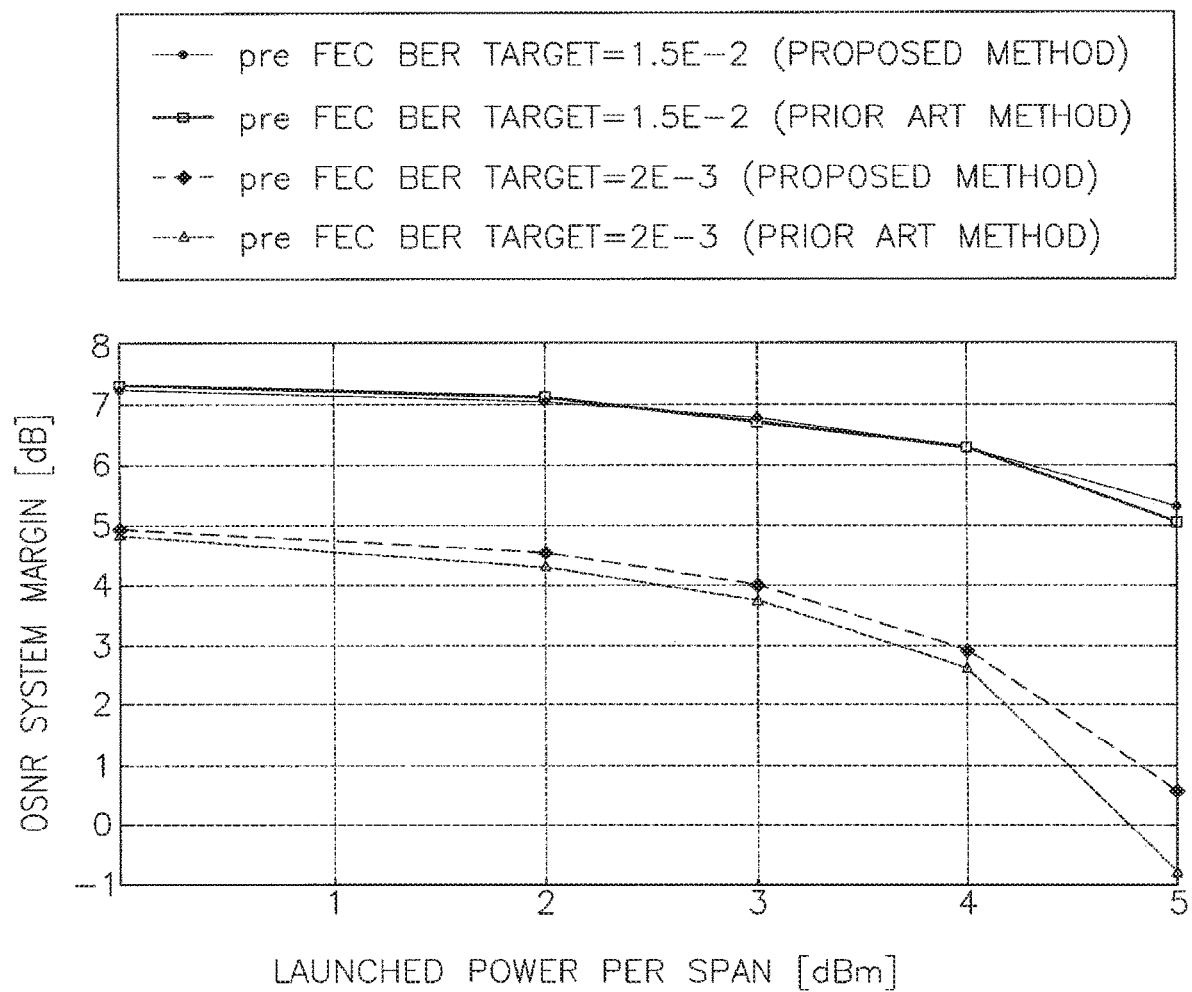

FIGS. 6A-6C exemplify experimental results of 1×120.6 Gb/s DP-QPSK channels being co-transmitted with 2×45.8 Gb/s DP-QPSK channels and 4×10.7 OOK channels over a dispersion managed link consisting of 5×100 km of fiber that complies with ITU-T Recommendation G.652. The channels are 50 GHz spaced apart from each other and there is a guard band of 300 GHz between the 120.6 Gb/s DP-QPSK channel and the 10.7 Gb/s channels. For each of the two first spans, a dispersion compensation fiber (DCF) was used at the span end in order to compensate for the 90 km of CD, while for each of the last three spans a DCF compensating for the 95 km was used.

FIG. 6A illustrates experimental results of the ESNR dependency on the OSNR for different launched optical power levels for a 120.6 Gb/s DP-QPSK channel with a received optical power of −10 dBm. As the launched power per span increases, the channel undergoes more nonlinear impairment, which is translated into nonlinear interference noise after carrying out the coherent detection. The dashed curves in this Fig. present an excellent fitting with the measurement and the following A and K parameters were obtained as a function of the launched power:

| Launched power per span | P = 0 dBm | P = 3 dBm | P = 4 dBm | P = 5 dBm |
|---|---|---|---|---|
| A | 0.41 | 0.41 | 0.41 | 0.41 |
| K | 0.009 | 0.0155 | 0.0195 | 0.0275 |

It may be noted that in dispersion managed links, only the K parameter is affected by the nonlinear impairments while A remains constant. Parameter A depends only on the back to back characteristics of the link (e.g. the symbol rate, modulation format, filtering mode) and therefore its value can be stored at a lookup table having the entries: symbol rate, modulation format and filtering mode.

FIG. 6B demonstrates the experimental results of the dependency of ESNR and OSNR thresholds, for pre FEC BER targets of $1.5 \times 10^{-2}$ and $2 \times 10^{-3}$, on the launched optical power levels, for 1a 20.6 Gb/s DP-QPSK channel with a received optical power of −10 dBm. It may be seen that the OSNR required for reaching the pre FEC BER target, increases along with the launched power per span, as a result of the nonlinear impairments. When the optical launched power is increased from 0 dB to 5 dB, the required OSNR level for $1.5 \times 10^{-2}$ pre FEC BER target, increases by 2.25 dB, while the required OSNR level for $2 \times 10^{-3}$ pre FEC BER target increases by 5.6 dB. It may also be seen that for a case of dispersion managed links, the ESNR required for reaching the pre FEC BER target value increases slightly along with the launched power per span. When increasing the optical launched power from 0 dB to 5 dB, the required ESNR level for $1.5 \times 10^{-2}$ pre FEC BER target increases by 0.25 dB, while the required OSNR level for $2 \times 10^{-3}$ pre FEC BER target increases by 0.35 dB. Unlike the non dispersion managed links cases, the ESNR required for obtaining the pre FEC BER target is slightly dependent on the launched optical power per span, since the nonlinear interference noise distribution deviates from the circularly symmetric complex Gaussian distribution. Therefore, one would expect to obtain an OSNR system margin error if the required ESNR values is acquired from a back to back set up (i.e. without using a fiber but with an ASE noise source in order to tune the OSNR as well as the ESNR levels) and the required ESNR values are retrieved from a lookup table which entries are function of the pre FEC BER target, symbol rate, and modulation format. However these errors are expected to be significant only in a case where the pre FEC BER target is substantially less than $4 \times 10^{-3}$ and for high nonlinear OSNR penalty (e.g. >2.5 dB).

FIG. 6C exemplifies an experimental comparison between the results obtaining by following the prior art method illustrated in FIG. 1, and the results obtained by implementing the proposed method of OSNR system margin monitoring, as a function of the launched power for a 120.6 Gb/s DP-QPSK channel. It is assumed that the channel OSNR at the receiver is fixed at 20 dBm and the optical received power is −10 dBm. It is also assumed that the ESNR reference values are set to 8.15 dB and 10.1 dB for pre FEC BER levels of $1.5 \times 10^{-2}$ and $2 \times 10^{-3}$ respectively, and that the optical received power is −10 dBm. For a pre FEC BER target of $2 \times 10^{-3}$, the error is below 0.35 dB for launched power of up to 4 dBm, whereas in the case of launched power of 5 dBm per span, the error increases to 1.35 dB due to the high nonlinear penalty (5.6 dB) and deviation of the nonlinear interference noise distribution from the circularly symmetric complex Gaussian distribution.

Figure 7:
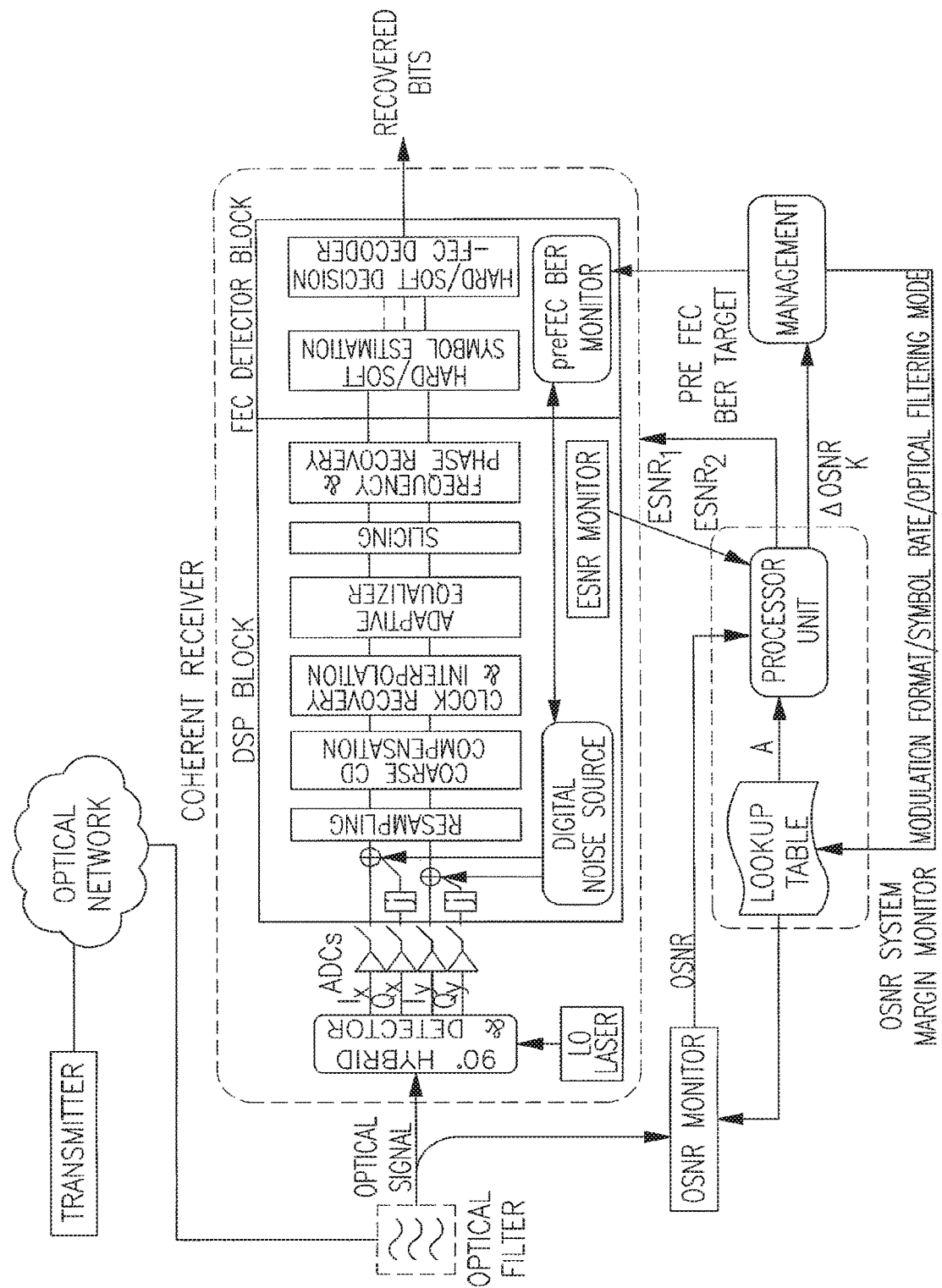
FIG. 7 illustrates schematically another embodiment provided by the present disclosure for an OSNR system margin monitoring.

FIG. 7 illustrates a schematic presentation of another embodiment of the present disclosure where the OSNR system margin monitoring is based upon monitoring the ESNR and the OSNR, and upon the use of a digital noise source generated at a DSP block of the coherent receiver. The value of parameter A is retrieved from a lookup table. Implementing this embodiment enables the operator to reduce measurement errors when the nonlinear interference noise deviates from circularly symmetric complex Gaussian distribution. After being conveyed along the network link, the optical signal arrives at its termination point and is forwarded to the coherent receiver. As was previously explained, before the coherent detection takes place, the signal may optionally be filtered by using an optical filter (colored detection) or it may be detected without passing the signal via an optical filter (colorless detection). After converting the optical signal to the electrical domain, the converted signal is digitalized (e.g. by using four high speed ADCs) and forwarded to a DSP block in order to compensate for the fiber impairments such as accumulated CD, polarization crosstalks, PMD and PDL. Digital compensation of the frequency carrier offset and optical phase noise, may also be performed. A digital noise source generates independent circular symmetric complex Gaussian noise samples that may be added to both polarization tributaries of the sampled detected signal. After applying the impairment compensation algorithms, the noisy symbols are recovered and are estimated using hard or soft detection techniques. The ESNR is estimated based on the hard or soft symbol decision and the FEC decoder block has the ability to provide the pre FEC BER. The amplitude of the digital noise samples is set so that the detected recovered symbols reach a given ESNR level.

The OSNR system margin monitor acquires from the management unit the necessary information that relates to the signal being monitored such as its modulation format, its symbol rate and its optical filtering mode. In case of a colored optical filtering mode, the information of the optical filter bandwidth may also be provided. The information thus obtained may then be used by the OSNR system margin monitor to retrieve from a lookup table the value of the A parameter. In addition, an external in-band OSNR module provides the OSNR level of the channel being monitored. The OSNR margin monitor sends a request to the coherent receiver in order to be provided with the ESNR level of the detected signal (channel), and the value $ESNR_{1,dB}$ is provided when the digital noise source is disconnected so as not to affect the detected signal samples. Then, the OSNR margin monitor sends a second request to the coherent receiver in order to deteriorate the ESNR level for reaching the pre FEC BER target value (information that is provided by the management unit to the optical receiver) by adding the digital sampled noise generated by the digital noise source. The value of the ESNR level obtained for the pre FEC BER target is substituted in the relevant equation provided hereinbefore as $ESNR_{2,dB}$. The digital noise source adapts the amplitude of the added noise samples according to the obtained pre FEC BER monitor, in order to reach the pre FEC BER target value. The ESNR level of the detected channel, $ESNR_{1,dB}$, is obtained as explained above when the digital noise source is disconnected from the detected signal samples. The OSNR margin monitor may evaluate th ENSR margin of the channel and the overall physical impairment strength parameter (the K parameter) is evaluated. Finally, by using $ESNR_{1,dB}$, $ESNR_{2,dB}$, A and K parameters, the OSNR margin, $\Delta OSNR_{dB}$, is calculated and may be sent back to the management unit for supervision or for further action if needed. The OSNR system margin monitor may be a part of an embedded software of a transceiver/combiner card that contains the coherent transmitter/receiver line module, or may be integrated within a DSP unit of the coherent receiver.

Due to the nature of the coherent detection, the operation may also be carried out by applying a colorless approach, and in such a case, a single proposed monitor may be used for scanning the OSNR system margin of the optical coherent channels present in the optical spectrum, by tuning the local oscillator optical frequency to the respective optical frequencies of the arriving channels.

Figure 8:
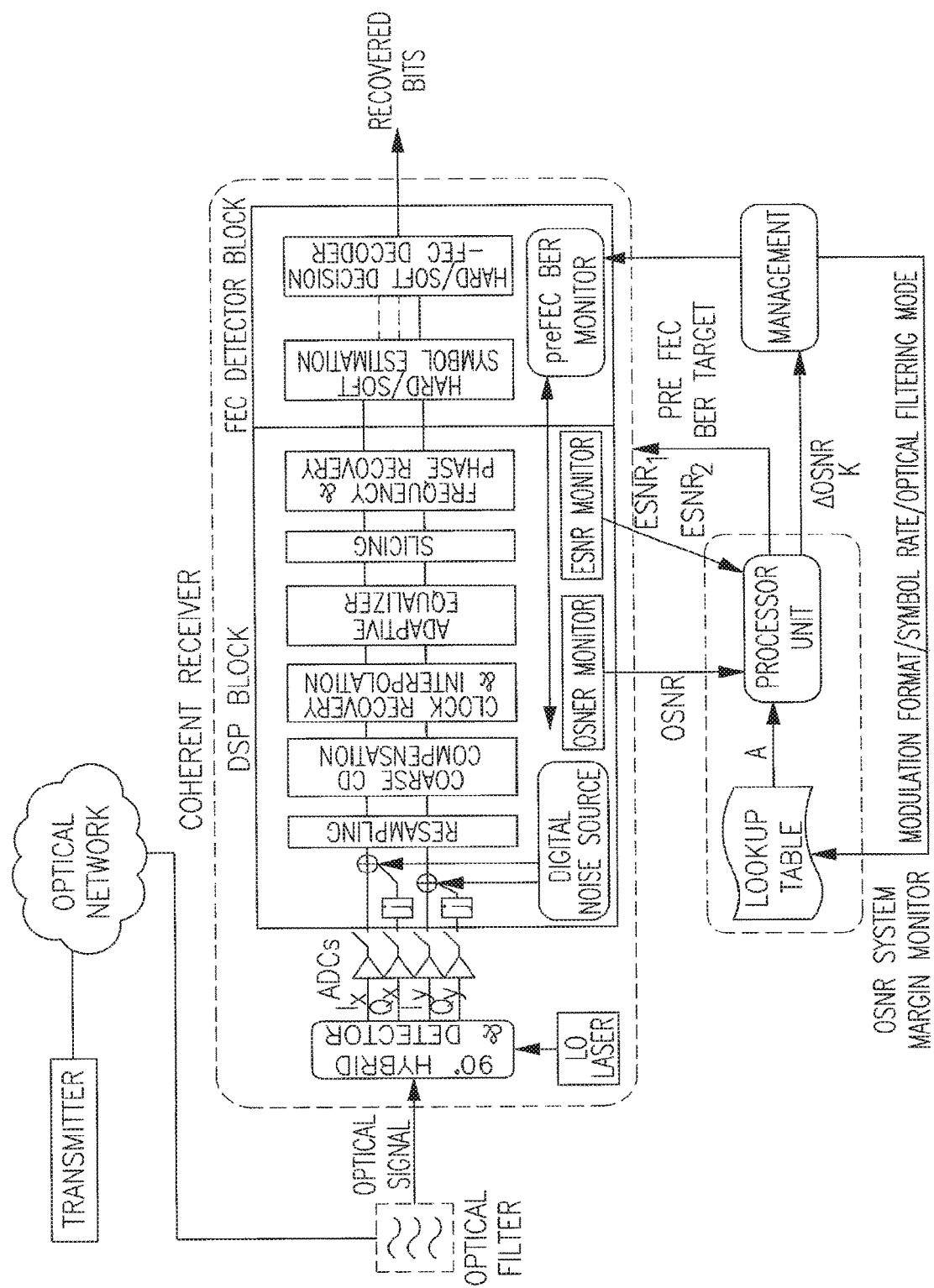
FIG. 8 illustrates schematically yet another embodiment provided by the present disclosure for an OSNR system margin monitoring.

FIG. 8 illustrates a schematic presentation of another embodiment of the present disclosure where the OSNR system margin monitoring is based upon monitoring the ESNR and the OSNR, upon the use of a digital noise source generator located at the DSP block of the coherent receiver and a lookup table to extract the value of parameter A therefrom. In this embodiment, the OSNR monitoring is carried out within a DSP block comprised in the coherent receiver.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A method for determining an optical signal-to-noise ratio (OSNR) system margin in an optical network, comprising:
   identifying a coherent optical signal;
   determining an OSNR and an electrical signal-to-noise ratio (ESNR) associated with the identified coherent optical signal;
   determining a reference ESNR for the identified coherent optical signal;
   determining a transmission characteristic parameter associated with the identified coherent optical signal;
   determining a physical impairment strength parameter associated with an optical channel associated with the coherent optical signal;
   determining the OSNR system margin based on the transmission characteristic parameter and physical impairment strength parameter; and
   determining changes over time in the OSNR system margin.

2. The method of claim 1, further comprising determining an ESNR margin by comparing the determined ESNR with the reference ESNR.

3. The method of claim 2, wherein the OSNR system margin is further determined based on the ESNR margin.

4. The method of claim 1, wherein the transmission characteristic parameter is retrieved from a database.

5. The method of claim 4, wherein the database comprises an entry of the transmission characteristic parameter depending upon at least one of: a modulation format of the identified coherent optical signal, a symbol rate of the identified coherent optical signal, and an optical filtering mode.

6. The method of claim 1, wherein the reference ESNR is retrieved from a database.

7. The method of claim 6, wherein the database comprises an entry of the reference ESNR depending upon at least one of: a pre-defined bit error rate (BER) target, a symbol rate of the identified coherent optical signal, a modulation format of the identified coherent optical signal, and an optical filtering mode.

8. The method of claim 1, wherein the reference ESNR is determined by increasing noise in the identified coherent optical signal until a pre-defined BER is reached.

9. The method of claim 1, wherein the physical impairment strength parameter is determined based on the transmission characteristic parameter.

10. The method of claim 1, further comprising diverting network traffic to another optical channel when the OSNR system margin is below a pre-defined threshold.

11. A non-transitory computer-readable medium storing instructions that, when executed by a processor, cause the processor to perform operations for determining an OSNR system margin in an optical network, the operations comprising:
    identifying a coherent optical signal;
    determining an OSNR and an ESNR associated with the identified coherent optical signal;
    determining a reference ESNR for the identified coherent optical signal;
    determining a transmission characteristic parameter associated with the identified coherent optical signal;
    determining a physical impairment strength parameter associated with an optical channel associated with the coherent optical signal;
    determining the OSNR system margin based on the transmission characteristic parameter and physical impairment strength parameter; and
    determining changes over time in the OSNR system margin.

12. The computer-readable medium of claim 11, wherein the operations further comprise determining an ESNR margin by comparing the determined ESNR with the reference ESNR.

13. The computer-readable medium of claim 12, wherein the operations further comprise determining the OSNR system margin based on the ESNR margin.

14. The computer-readable medium of claim 11, wherein the transmission characteristic parameter is retrieved from a database.

15. The computer-readable medium of claim 14, wherein the database comprises an entry of the transmission characteristic parameter depending upon at least one of: a modulation format of the identified coherent optical signal, a symbol rate of the identified coherent optical signal, and an optical filtering mode.

16. The computer-readable medium of claim 11, wherein the reference ESNR is retrieved from a database.

17. The computer-readable medium of claim 16, wherein the database comprises an entry of the reference ESNR depending upon at least one of: a pre-defined BER target, a symbol rate of the identified coherent optical signal, a modulation format of the identified coherent optical signal, and an optical filtering mode.

18. The computer-readable medium of claim 11, wherein the operations further comprise generating a digital noise and determining the reference ESNR by combining the generated digital noise with the identified coherent optical signal until a pre-defined BER target is reached.

19. The computer-readable medium of claim 11, wherein the operations further comprise determining the physical impairment strength parameter based on the transmission characteristic parameter.

20. The computer-readable medium of claim 11, wherein the operations further comprise diverting network traffic to another optical channel when the OSNR system margin is below a pre-defined threshold.

* * * * *